US008805720B2

(12) United States Patent
Flake et al.

(10) Patent No.: US 8,805,720 B2
(45) Date of Patent: Aug. 12, 2014

(54) FEEDBACK LOOP FOR CONSUMER TRANSACTIONS

(75) Inventors: Gary W. Flake, Bellevue, WA (US); Jeffrey R. Hemmen, Renton, WA (US); Alexander Gounares, Kirkland, WA (US); David M. Chickering, Bellevue, WA (US); Eric J. Horvitz, Kirkland, WA (US); Michael Connolly, Seattle, WA (US); Lili Cheng, Bellevue, WA (US); Kamal Jain, Bellevue, WA (US); George P. Moromisato, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 643 days.

(21) Appl. No.: 11/959,874

(22) Filed: Dec. 19, 2007

(65) Prior Publication Data

US 2008/0154704 A1 Jun. 26, 2008

Related U.S. Application Data

(60) Provisional application No. 60/870,926, filed on Dec. 20, 2006.

(51) Int. Cl.
*G06Q 99/00* (2006.01)
*G06Q 30/02* (2012.01)
*G06Q 30/06* (2012.01)

(52) U.S. Cl.
CPC ........ *G06Q 30/0224* (2013.01); *G06Q 30/0255* (2013.01); *G06Q 30/0631* (2013.01)
USPC ..................... 705/14.25; 705/14.53; 705/26.7

(58) Field of Classification Search
USPC .................................. 705/14.25, 14.53, 26.7
See application file for complete search history.

(56) References Cited

U.S. PATENT DOCUMENTS

| 5,717,866 A * | 2/1998 | Naftzger ..................... 705/14.38 |
| 6,292,786 B1 | 9/2001 | Deaton et al. |
| 6,332,127 B1 | 12/2001 | Bandera et al. |
| 6,533,168 B1 * | 3/2003 | Ching ........................... 235/375 |
| 6,545,596 B1 | 4/2003 | Moon |
| 6,785,551 B1 | 8/2004 | Richard |
| 6,874,127 B2 | 3/2005 | Newell et al. |
| 7,046,247 B2 * | 5/2006 | Hao et al. ...................... 345/440 |
| 7,155,210 B2 | 12/2006 | Benson |
| 2001/0054066 A1 | 12/2001 | Spitzer |
| 2002/0032035 A1 | 3/2002 | Teshima |
| 2002/0035536 A1 | 3/2002 | Gellman |
| 2002/0102993 A1 | 8/2002 | Hendrey et al. |

(Continued)

OTHER PUBLICATIONS

Final Office Action mailed Jan. 10, 2012 in U.S. Appl. No. 11/959,844, 19 pages.
Final Office Action mailed Mar. 14, 2012 in U.S. Appl. No. 11/959,864, 23 pages.

(Continued)

*Primary Examiner* — James D Nigh
(74) *Attorney, Agent, or Firm* — Dave Ream; Peter Taylor; Micky Minhas

(57) ABSTRACT

The claimed subject matter relates to an architecture that can facilitate verification or feedback in association with consumer transactions. In particular the architecture can image a transaction receipt, translate the image into text-based data, and extract relevant transaction data there from. Such relevant transaction data can be saved to a data store maintained or supervised by the customer and/or transmitted to authorized components that can benefit from data related to transaction histories, verification, and/or feedback.

18 Claims, 11 Drawing Sheets

(56) References Cited

U.S. PATENT DOCUMENTS

| | | |
|---|---|---|
| 2002/0107027 A1 | 8/2002 | O'Neil |
| 2003/0214504 A1* | 11/2003 | Hao et al. ............... 345/440 |
| 2003/0216960 A1 | 11/2003 | Postrel |
| 2004/0143491 A1 | 7/2004 | Steinberg |
| 2004/0176105 A1 | 9/2004 | Ashmore et al. |
| 2005/0071174 A1* | 3/2005 | Leibowitz et al. ............. 705/1 |
| 2005/0143052 A1 | 6/2005 | Pradhan et al. |
| 2005/0177446 A1 | 8/2005 | Hoblit |
| 2005/0209921 A1 | 9/2005 | Roberts et al. |
| 2005/0221843 A1 | 10/2005 | Friedman et al. |
| 2005/0245241 A1 | 11/2005 | Durand et al. |
| 2005/0288998 A1* | 12/2005 | Verma et al. ............... 705/14 |
| 2006/0041622 A1 | 2/2006 | Qutub et al. |
| 2006/0059044 A1 | 3/2006 | Chan et al. |
| 2006/0242017 A1 | 10/2006 | Libes et al. |
| 2006/0271438 A1 | 11/2006 | Shotland et al. |
| 2006/0282312 A1 | 12/2006 | Carlson et al. |
| 2007/0060173 A1* | 3/2007 | Ramer et al. ............ 455/456.3 |
| 2007/0067297 A1 | 3/2007 | Kublickis |
| 2007/0083428 A1 | 4/2007 | Goldstein |
| 2007/0174123 A1 | 7/2007 | Dorr |
| 2007/0244750 A1 | 10/2007 | Grannan et al. |
| 2008/0140509 A1 | 6/2008 | Amjadi |
| 2008/0153513 A1 | 6/2008 | Flake |
| 2008/0154703 A1 | 6/2008 | Flake |
| 2008/0154720 A1 | 6/2008 | Gounares |
| 2008/0154725 A1 | 6/2008 | Flake |
| 2010/0030624 A1 | 2/2010 | Vanska et al. |

OTHER PUBLICATIONS

Final Office Action in U.S. Appl. No. 11/959,864 mailed Jan. 2, 2014, 20 pages.
Office Action mailed Dec. 9, 2010 in U.S. Appl. No. 11/767,360, 15 pages.
Office Action mailed Aug. 16, 2010 in U.S. Appl. No. 11/767,360, 13 pages.
deCastro, et al., "Mobile Advertising System Utilizing User's Contextual Information", 2006, Proceedings of the 7th International Conference on Mobile Data Management, IEEE 5 pages.
Salo, et al., "Retailer Use of Permission-Based Mobile Advertising", Department of Marketing, University of Oulu, Finland, 21 pages.
Tahtinen, et al., "Special Features of Mobile Advertising and Their Utilization", University of Oulu, Finland, 8 pages.
Aalto, et al., "Bluetooth and WAP Push Based Location-Aware Mobile Advertising System", 2004, ACM, 10 pages.
Office Action mailed Aug. 31, 2010 in U.S. Appl. No. 11/862,766. 16 pages.
Office Action mailed Feb. 15, 2011 in U.S. Appl. No. 11/862,766, 17 pages.
Office Action mailed May 27, 2011 in U.S. Appl. No. 11/767,360, 22 pages.
Office Action mailed Aug. 16, 2011, U.S. Appl. No. 11/959,844, 23 pages.
Office Action mailed Sep. 16, 2011 in U.S. Appl. No. 11/959,864, 18 pages.
Non-Final Office Action in U.S. Appl. No. 11/959,864 mailed Jul. 2, 2013, 17 pages.

* cited by examiner

FEEDBACK LOOP FOR CONSUMER TRANSACTIONS

CROSS-REFERENCE TO RELATED APPLICATIONS

This application claims the benefit of U.S. Provisional Application Serial No. 60/870,926, filed Dec. 20, 2006, entitled "ARCHITECTURES FOR SEARCH AND ADVERTISING." This application is related to U.S. application Ser. No. 11/767,360, filed on Jun. 22, 2007, entitled "MOBILE AD SELECTION AND FILTERING." This application is related to U.S. application Ser. No. 11/959,844, filed on Dec. 19, 2007, entitled "RETAILER COMPETITION BASED ON PUBLISHED INTENT." This application is related to U.S. application Ser. No. 11/959,864, filed on Dec. 19, 2007, entitled "ENGAGEMENT-BASED REWARDS." The entireties of these applications are incorporated herein by reference.

BACKGROUND

There has historically been a continuous struggle between consumers and third parties with respect to sharing information. On the one hand, by acquiring information relating to the consumer, third parties such as advertisers can tailor ads or other solicitations to be appropriate for the consumer, which, ultimately, can be beneficial for all parties involved. However, on the other hand, advertisers always want to reach consumers, yet oftentimes a consumer does not want to be bothered by the advertiser. Thus, many consumers simply refuse to sanction any sort of information sharing that might lead to unsolicited, unwanted, or inappropriate solicitations.

One particularly coveted type of information associated with consumers is profile information, and specifically transaction records, histories, or the like. Conventionally, there are many ways to utilize transaction histories of a particular customer such as to verify a transaction or provide feedback, however, advertisers or vendors generally only have access to their own transaction data with that customer, but not transaction data between that customer and other vendors. Moreover, such information, even if kept private and not shared, can be useful to the customer herself, but traditional means of obtaining the data in a useable format has been difficult or inefficient and generally involves manual data entry that is prone to mistakes or deficiencies due to common treatment of such data entry as a low priority task on the part of the consumer.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can track consumer transaction in order to, e.g. facilitate verification or feedback. To these and other related ends, the architecture can obtain a set of relevant transaction data that relates to a transaction between a customer and a vendor. The relevant transaction data can be acquired from a transaction receipt printed by the vendor at the completion of a transaction. In another aspect, portions of the relevant transaction data can be acquired from an electronic record included in a vendor data store, potentially accessed at a point-of-sale (POS) with a transaction reference ID included in the receipt or provided in another way.

In an aspect of the claimed subject matter, all or portions of the architecture can be in a mobile device associated with the customer, such as a cell phone. One common feature of cell phones (as well as other mobile devices) is a camera, which can be employed to image the transaction receipt. The image can then be translated into text-based data by, e.g., employing optical character recognition techniques, potentially utilizing specialized dictionaries or rules especially suited or adapted for record or receipt-type images. Additionally or alternatively, similar information can be obtained from the vendor, generally at the POS, which can be accomplished by way of a wireless connection with, e.g. a cash register or other POS component.

Regardless of how the data is obtained, the architecture can then select from the data that which is determined or inferred to be relevant and store the relevant transaction data to a data store maintained by the customer such that any potential access to the data can be private and only accessible by, e.g., applications instantiated by or otherwise related to the customer. Accordingly, transaction data can be aggregated in a more robust manner and employed in any number of ways, many of which are described herein.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
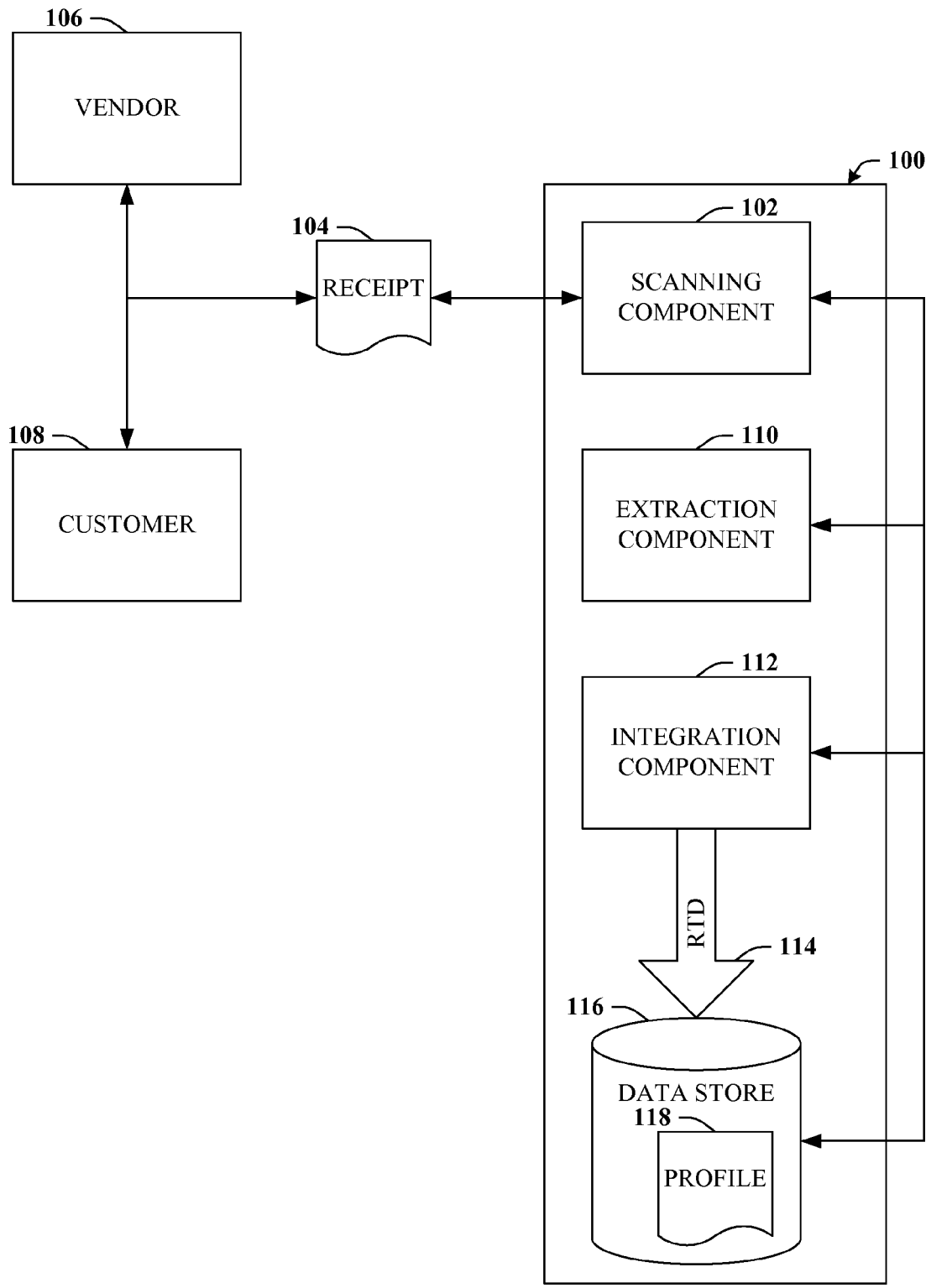
FIG. 1 illustrates a block diagram of a system that can track consumer transactions in order to facilitate verification or feedback.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can track consumer transactions in order to facilitate verification or feedback is depicted. Generally, system 100 can include scanning component 102 that can read receipt 104, wherein receipt 104 can relate to a transaction between vendor 106 and consumer 108. For example, the transaction can be a purchase of an item (e.g. product or service), an agreement for a future purchase or delivery, or substantially any type of transaction for which it is customary to keep or supply records (e.g., receipt 104) and/or substantially any type of transaction that routinely occurs at a point-of-sale (POS) of a business establishment of vendor 106. Appreciably, vendor 106 is intended to include retailers, advertisers, or agents thereof, or substantially any business establishment that solicits transactions from consumers and/or customer 108. Customer 108 is intended to include substantially any individual or entity who engages in a verifiable transaction with vendor 106 such as a purchase of an item for which there is a receipt or record.

System 100 can also include extraction component 110 that can identify and extract relevant transaction data 114 included in receipt 104. For example, receipt 104 can be a paper receipt, typically issued by vendor 106 that characterizes or describes the transaction with customer 108, however, other types of receipts 104 are possible such as electronic receipt 104 as are other sources of relevant transaction data 114, which is further detailed in connection with FIGS. 3 and 4. Commonly, receipt 104 is created, printed, and/or transmitted at a POS of vendor 106 during check-out or upon completion of the transaction.

In accordance therewith, scanning component 102 can be or can include a camera that creates a digital image of receipt 104 or another type of optical device that creates an image of receipt 104. Extraction component 110 can receive the image and can translate the image of receipt 104 into text-based and/or machine-editable data in order to identify relevant transaction data 114. For example, extraction component 110 can employ well-known optical character recognition (OCR) techniques to translate the image. These or other suitable translation technique can include utilization of specialized dictionaries, grammars, formatting rules (e.g., size, position, font . . . ) and so on, as well as various machine-learning techniques or Bayesian-based confidence models intended to improve or optimize translation of receipt 104 or to templatize the translation for a schema associated with a particular vendor 106.

Identification of relevant transaction data 114 can be accomplished in a general manner in which all or substantially all data included in receipt 104 that can potentially be relevant for transaction verification or feedback purposes can be identified and extracted; or can be accomplished in more specific ways such as when attempting to verify or record only transaction data specific to one or a small set of applications. For instance, it is readily apparent that the claimed subject matter can provide a rich data resource for numerous applications that in some part rely upon or can be improved by access to confirmed transaction data, and equally apparent that the focus of what portions or types of transactions will be relevant can depend upon the specific application. For example, an ad targeting application might focus more (e.g. consider relevant) on data relating to transaction histories or items purchased, whereas an application directed to personal spending analysis/reporting might be more interested in the amount spent for each transaction. As another example, a third application (e.g., an application directed to engagement-based rewards) might consider identification of vendor 106 to be relevant, whereas the previous two example applications might not. Thus, relevant transaction data 114 can be identified more broadly wherein all or substantially all transaction data that can potentially be relevant can be identified and extracted in a single pass; or more narrowly wherein only transaction data that is potentially relevant to one or a few particular applications is identified and extracted, which is further described in connection with FIG. 5.

System 100 can also include integration component 112 that can store relevant transaction data 114 to data store 116, wherein data store 116 can include profile 118 that can be associated with customer 116. Thus, integration component 112 can store relevant transaction data 114 to suitable portions of profile 118 of customer 108. Generally, data store 116 is a data store associated with and/or maintained by or exclusively for customer 108. Often data store 116 can be included in a device of customer 108 such as a mobile device, but can also be distributed such that portions or copies of data store 116 or information stored therein can exist at disparate locations. For example, relevant transaction data 114 for a recent shopping session can be stored to a mobile device data store 116 of customer 108 in a temporary fashion, and then uploaded to a home computer data store 116 for bulk or centralized storage and/or processing.

Therefore, it should be appreciated that all or portions of system 100 can be included in a mobile device such as a cellular phone, including smart phones and the like. In addition, the mobile device can be substantially any portable electronic device, typically including an optical reader/imager/camera such as a laptop, a tablet, a media player/recorder, a Personal Digital Assistants (PDA), a game, a fob, and so on. The mobile device can be a handheld device as well as wearable device and generally includes suitable hardware for one or more types of wireless communication such as cellular, wireless fidelity or "WiFi" (IEEE 802.11x specifications), Bluetooth (IEEE 802.15.x specifications), Near Field Communication (NFC), Radio Frequency Identification (RFID), infrared, etc.

Appreciably, data store 116 or suitable portions thereof can be secured such that private or personal information is not openly available to third parties, yet also mobile and available for use at appropriate times or in connection with suitable locations or applications. Hence, customer 108 can maintain and/or have exclusive control over all information included in data store 116, yet still in many cases be provided numerous benefits described herein that are often conventionally associated only with disclosure of such personal information to third parties (e.g., advertisers), which commonly results in misuse of the data and/or effects that are inconvenient or inappropriate for customer 108.

Profile 118 can include a variety of information relating to customer 108, such as that which is expressly described herein as well as other information suitable for or within the spirit of the claimed subject matter. For example, profile 118 can include one or more transaction histories that can relate to substantially any type of consumer transaction such as purchases (e.g., products, services, warranties . . . ), time of purchase, returns, use of coupons, feedback, voting, reviews, or opinions, and so forth.

Additionally, profile 118 can include shopping preferences such as a default shopping mode that, e.g., indicates a style or habits relating to shopping for customer 108. For example, the shopping preferences can relate to how likely customer 108 is to spend extra time shopping to ferret out bargains and/or responsiveness to promotions. Furthermore, the shopping preferences can relate to how adverse customer 108 is to crowded shopping environments, or to particular policies or practices of certain vendors, etc. Naturally, other examples exist, but it should be appreciated that shopping preferences can relate to many aspects of customer 108 and can be utilized in several ways, as described infra. Moreover, shopping preferences can be input directly by customer 108, received by way of associated devices (e.g., devices of customer 108, vendor 106, or third party devices) or in some cases inferred based upon, e.g., examination of one or more transaction histories.

Demographic data can also be included in profile 118 such as age, gender, income, as well as hobbies, interests, or viewpoints. As with shopping preferences, some demographic data can be received as input directly from customer 108 or other suitable sources, or inferred from what is known or can be determined about customer 108. In addition, it should be understood that one or more user IDs can be associated with customer 108 and can be included in profile 118. These IDs can represent customer 108 as well as one or more devices of customer 108, all or portions of which can be stored as keys on a key ring.

Figure 2:
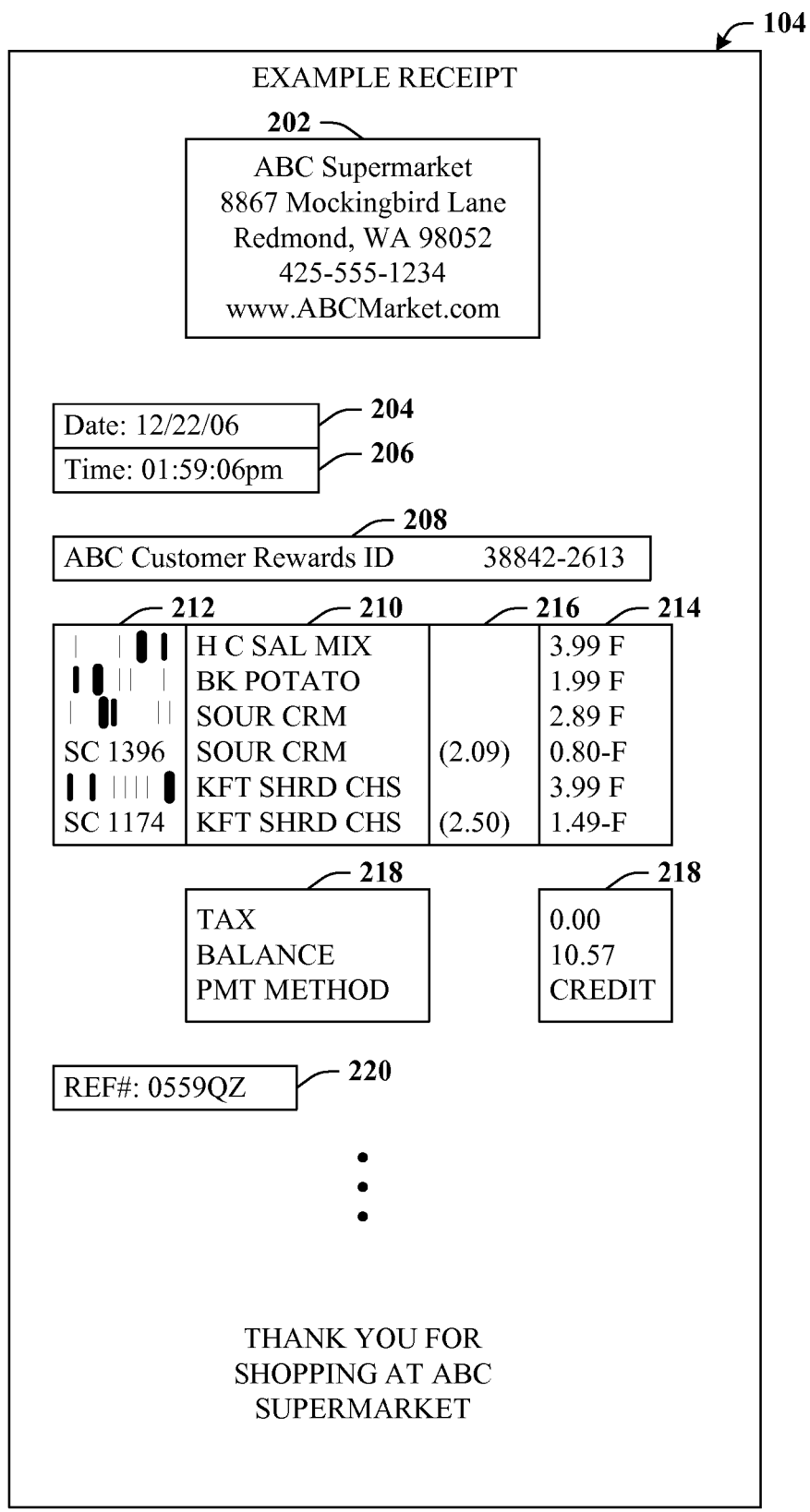
FIG. 2 illustrates a block diagram of example receipt 104 that can include various relevant transaction data 114.

While still referring to FIG. 1, but turning also now to FIG. 2, example receipt 104 that can include various relevant transaction data 114 is provided. As noted previously, receipt 104 can be a paper receipt printed by vendor 106 at the POS such as that depicted as example receipt 104. It should be appreciated that all or portions of the information described herein (e.g. information associated with reference numerals 202-220) as well as other suitable information included in receipt 104 or elsewhere can be, but need not in all situations be, considered relevant transaction data 114 identified and extracted by extraction component 110. Receipt 104 can include information 202 associated with vendor 106 such as name, location or mailing address, phone number or other contact information, a universal resource locator, and so forth. Receipt 104 can also include date 204 and time 206 that relate to when the transaction between customer 108 and vendor 106 occurred.

Example receipt 104 can also include loyalty/rewards program ID 208. ID 208 is typically a unique identifier for customer 108 assigned and maintained by vendor 106 largely for internal purposes. For example, vendor 106 can provide a wallet-sized or keychain style rewards card including ID 208 that customer 108 scans in or inputs at the POS to accrue rewards for purchases or other transactions. In some cases, portions of rewards ID 208 might be occluded such that receipt 104 provides only a partial ID 208. For instance receipt 104 can list ID 208 as, e.g., "******2613" rather than "38842-2613" or in some other suitable manner. In cases in which ID 208 is deemed to be relevant, but cannot be obtained, or only partially so, from receipt 104, ID 208 can instead be read by scanning component 102 from the underlying rewards card. In particular, customer 106 can, e.g. be prompted to scan the card in addition to scanning receipt 104.

Block 210 of example receipt 104 can include descriptors for one or more purchased items. It should be appreciated that in most cases, descriptor 210 will contain abbreviations for the item and/or brand information that can be expanded, augmented, or translated to full item descriptions by extraction component 110. For example, the initial item listed in block 210 is "H C SAL MIX". Extraction component 110 can translate this to text-based data from an image of receipt 104, and can further expand this particular descriptor 210 to read instead "Healthy Choices brand Salad Mix" or similar. The latter part can be accomplished by way of a Universal Product Code (UPC) included in block 212. Extraction component 110 can translate the UPC and retrieve the full product descriptor from a UPC data store, which can be disparate from data store 116 and can be accessed by way of one or more networks. However, in some cases, UPC information might not be provided by receipt 104. Accordingly, extraction component 110 can utilize various other sources to obtain the augmented version of the item descriptor, which is further described in connection with FIG. 3.

Block 212 can also illustrate information associated with savings codes that can, inter alia, indicate that a purchased item is on sale and thus provides a discount or rebate, often in connection with rewards ID 208. For example savings code "SC 1369" provides an 80 cent discount for the sour cream item and SC 1174 offers a discount of $1.49 on Krafty Brand Shredded Cheese, as indicated by price block 214 and discounted price block 216. In addition, example receipt 104 can further include various other data such as, e.g., an associated total or balance for the transaction, sales tax, payment method, and so on, as indicated by blocks at reference numeral 218.

Another type of data that can potentially be identified as relevant transaction data 114 can be transaction reference ID 220. Transaction reference ID is conventionally a common feature of transaction receipts employed by vendor 106 to identify or refer to the transaction in accordance with that vendor's particular recordkeeping scheme. For example, reference ID 220 can be a primary or unique key for an electronic record stored of the transaction, which is described in more detail with reference to FIG. 4.

Figure 3:
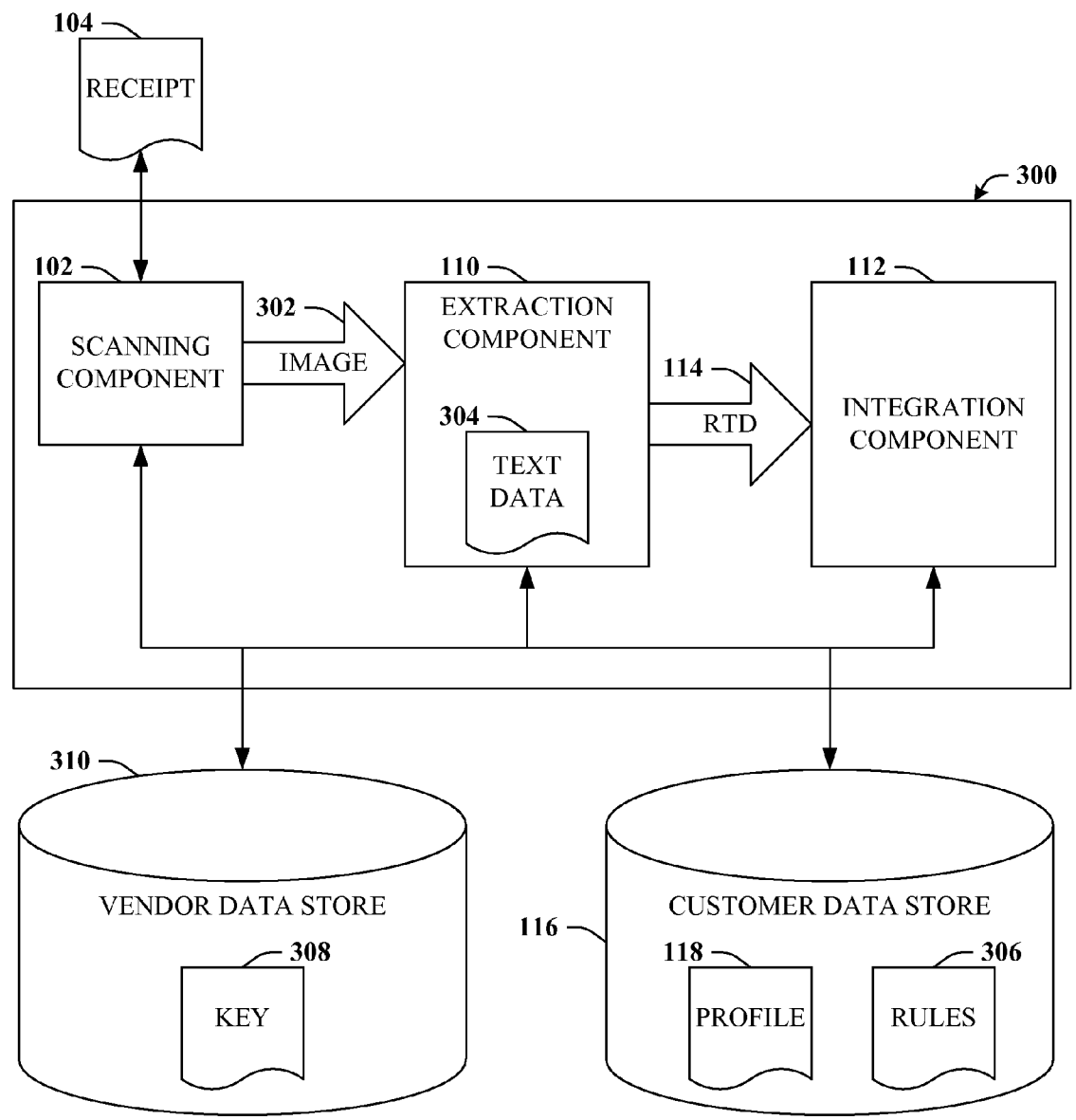
FIG. 3 depicts a block diagram of a system that can verify consumer transactions to facilitate feedback.

Referring now to FIG. 3, system 300 that can verify consumer transactions to facilitate feedback is illustrated. In general, system 300 can include scanning component 102 that can generate image 302. Image 302 can be a digital or optical image of receipt 104 that relates to a transaction. Image 302 can be provided to extraction component 110, which can translate image 302 into machine-editable text-based data 304 by OCR or other suitable means. Extraction component 110 can also identify and extract relevant transaction data 114 from text data 304 and transmit relevant transaction data 114 to integration component 112. Integration component 112 can store relevant transaction data 114 to data store 116, which, although not expressly depicted as such, can be included in whole or in part in system 300, which, in turn, can be wholly or partially included in a mobile device associated with customer 108. In particular, integration component 112 can store relevant transaction data 114 to profile 118 or portions thereof such as transaction histories, demographic portions and so on. Additionally, integration component 112 can provide feedback relating to verified transaction information to other or disparate components that can benefit from such data as described in connection with FIG. 5.

It should be understood that in addition to profile 118, data store 116 can also include specialized rules 306 such as dictionaries, templates, tables, indices, and so forth that can aid extraction component 110 in translation of receipt 104. These rules 306 can indicate, e.g., that "KFT SHRD CHS" is indeed a proper translation of an item descriptor (e.g., block 210 of FIG. 2) even though all of the individual terms are abbreviations rather than valid conventional dictionary words. Moreover, rules 306 can further aid in expanding the translated text into full descriptions (e.g. "Krafty brand shredded cheese) based upon one or more specialized dictionaries, which can be market domain, or even vendor 106 specific, and can be generated over time based upon transactions between customer 108 and vendor 106 or based upon other data.

According to an aspect of the claimed subject matter, extraction component 110 can expand or augment portions of text data 304 based upon information supplied by vendor 106. For example, extraction component 110 can communicate with a data store maintained by vendor 106 such as vendor data store 310 in order to retrieve legend 308. Legend 308 can provide vendor-specific information as to all or portions of the data included in receipt 104 such as, e.g. abbreviations used or savings codes, etc. In some cases, access to data maintained by vendor 106 might be limited or restricted such that customer 106 can only retrieve information associated with his or her own transactions. Accordingly, reference ID 220 can be transmitted to vendor 106 such that vendor 106 can determine what information is appropriate to share. It should be appreciated that reference ID 220 can be read from receipt 104 by scanning component 102 and identified as relevant transaction data 114 by extraction component 110 as substantially described herein or acquired in another way, such as being received automatically at the POS or manually input by customer 108.

It should be appreciated that scanning component 102 can also read adequate information directly from products. For example, customer 108 can image product descriptors, UPC, and so on from the product itself as the product is placed in a shopping cart, potentially purchasing items incrementally while shopping instead of all at once during check-out. However, in such case where scanning component 102 reads product packaging instead of receipt 104, adequate assurances may be required such that the purchase can be verified. It should be further appreciated that receipt 104 can be verified to be authentic based upon, e.g., transaction reference ID 220. For instance, a communication session can be opened with vendor 106 to check against a list of valid transaction IDs 220 to mitigate forgery of receipt 104 or other types of fraud.

Figure 4:
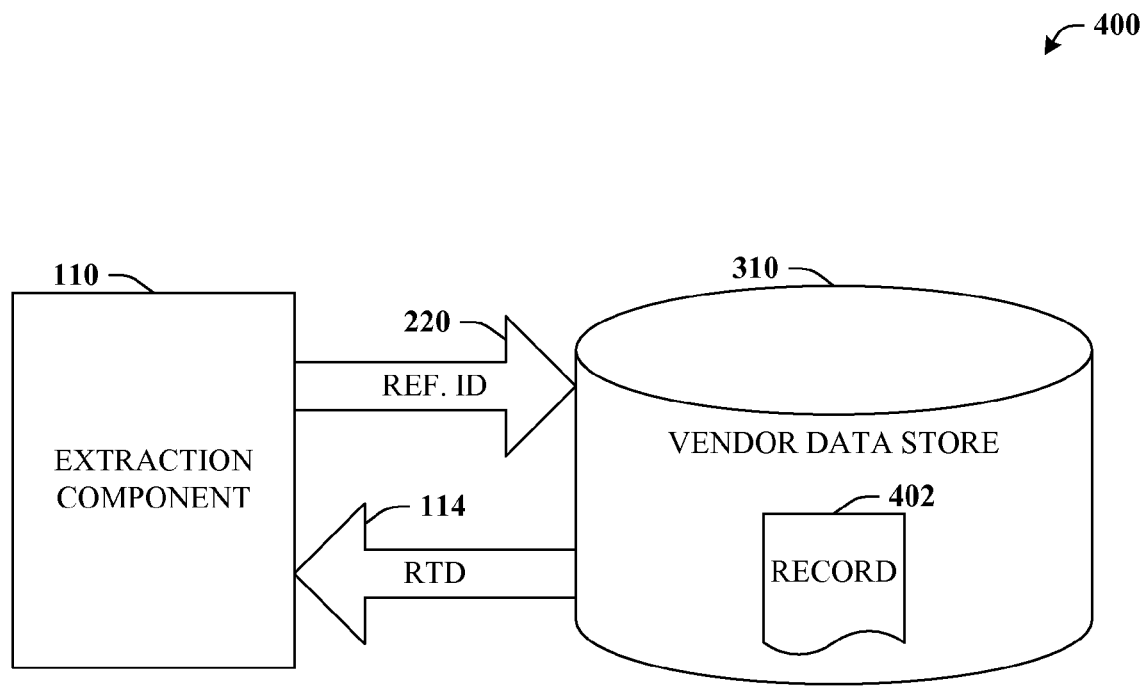
FIG. 4 illustrates a block diagram of a system that can retrieve relevant transaction data 114 from vendor 106.

While still referring to FIG. 3, but turning as well to FIG. 4, system 400 that can retrieve relevant transaction data 114 from vendor 106 is depicted. It should be appreciated that in addition to transaction legend 308 described supra, extraction component 110 can obtain all or portions of relevant transaction data 114 directly from vendor data store 310. For example, reference ID 220 can be provided to vendor 106 in order to locate record 402 of the transaction. Record 402 can be substantially similar to receipt 104, but in electronic format and can potentially include additional data depending upon the schema utilized by vendor 106. Thus, in addition to or alternatively to deriving all or portions of relevant information from printed receipt 104, such information can also be acquired from electronic receipt 104 that can be stored as record 402. Appreciably, electronic receipt 104 can be obtained directly from vendor 106, in some cases wirelessly at the POS.

It should be understood that in some cases described herein, direct communication with vendor data store 310 and customer data store 116 can be handled by integration component 112 even though these features are at times illustrated in connection with extraction component 110 to introduce in a clear fashion certain concepts associated with the claimed subject matter. In addition, it should be further understood that, in accordance with an aspect, integration component 112 can facilitate additional features in addition to managing accesses and/or updates to data stores 116, 310 as further by FIG. 5 and the associated text infra.

Figure 5:
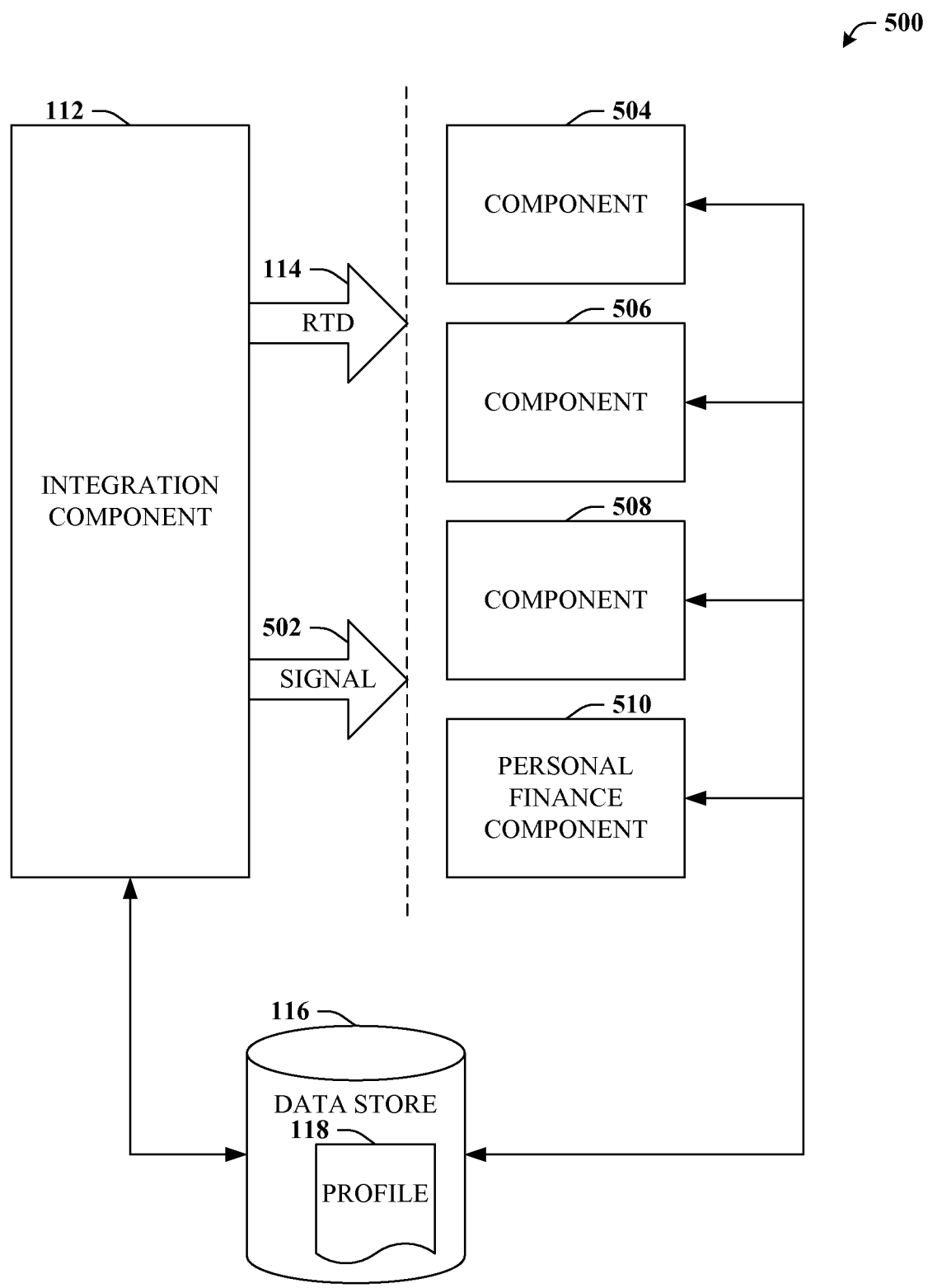
FIG. 5 depicts a block diagram of a system that can communicate with numerous other components to provide additional benefits associated with transaction verification or feedback.

Referring to FIG. 5, system 500 that can communicate with numerous other components to provide additional benefits associated with transaction verification or feedback is provided. In particular, regardless of how relevant transaction data 114 is obtained (e.g., read from receipt 104 or extracted from vendor data store 310), relevant transaction data 114 can be delivered to various other suitable components (e.g., component 504-510). In some cases relevant transaction data 114 can be directly transmitted while in other cases, integration component 112 can store relevant transaction data 114 to data store 116 and/or update profile 118 included in data store 116 either or both of which can be accessible by components 504-510. In the latter case, when integration component 112 updates profile 118 based upon relevant transaction data 114, signal 502 can be delivered to one or more components 504-510 to, e.g. serve as an alert that new data is available rather than directly transmitting such data.

Components 504-508 can be substantially any component that can benefit from verified transaction information such as that included in receipt 104 or record 402. One such example can be illustrated by personal finance component 510 that can utilize relevant transaction data 114 to update expense reports for customer 108, prepare tax documents, and so forth. With the foregoing in mind it can now be appreciated that relevant transaction data 114 can be substantially any verified transaction information that can be beneficial to components 504-510. While component 504-508 can be substantially any component that can benefit from verified transaction information, a number of examples are provided.

In particular, examples of components 504-508 are provided in the context of components described herein (including, of course, that which has been incorporated by reference into this disclosure) to provide concrete illustrations of the spirit and scope of the claimed subject matter, but not necessarily to limit the claimed subject matter to only those examples. In one aspect, integration component 112 can transmit relevant transaction data 114 to component 504 that facilitates update of a veracity score included in profile 118, wherein the veracity score can reflect a tendency of customer 108 to fulfill published shopping objectives. For example, component 504 can be a ranking component that constructs or updates the veracity score by examining published intentions of customer 108 with respect to a verified purchase included in relevant transaction data 114.

In another aspect, integration component 112 can transmit relevant transaction data 114 to component 506 that can facilitate verification that an engagement-based incentive associated with profile 118 has been satisfied. For instance component 506 can be a promotion component that constructs an engagement-based incentive based upon a purchase and/or receives feedback to verify that the engagement-based incentive has been satisfied, both of which can be included in relevant transaction data 114 delivered to component 506.

According to a further aspect of the claimed subject matter, integration component 112 can transmit relevant transaction data 114 to component 508 such as a classification component that can determine the relevance of an advertisement based upon transactions or behavior of customer 108; or a selection component that can select an advertisement based upon an attribute associated with profile 118 (e.g. transaction history). It should be underscored again that integration component 112 can transmit relevant transaction data 114 directly to component 504-510; or write relevant transaction data 114 to data store 116, potentially updating profile 118, and signaling by way of signal 502 that data store 116 (or profile 118) has been updated with relevant transaction data 114 that can be utilized according to the particular application of one or more components 504-510.

It should also be understood that components 504-510 can be limited only to components that have access to profile 118 such as components owned or maintained by customer 108 or those with appropriate permissions. Accordingly, the claimed subject matter can provide collect, aggregate, examine, recommend, secure, and maintain a variety of personal data, while providing virtually unlimited and feature-rich applications or uses of that data in a manner that is privacy-centric.

Figure 6:
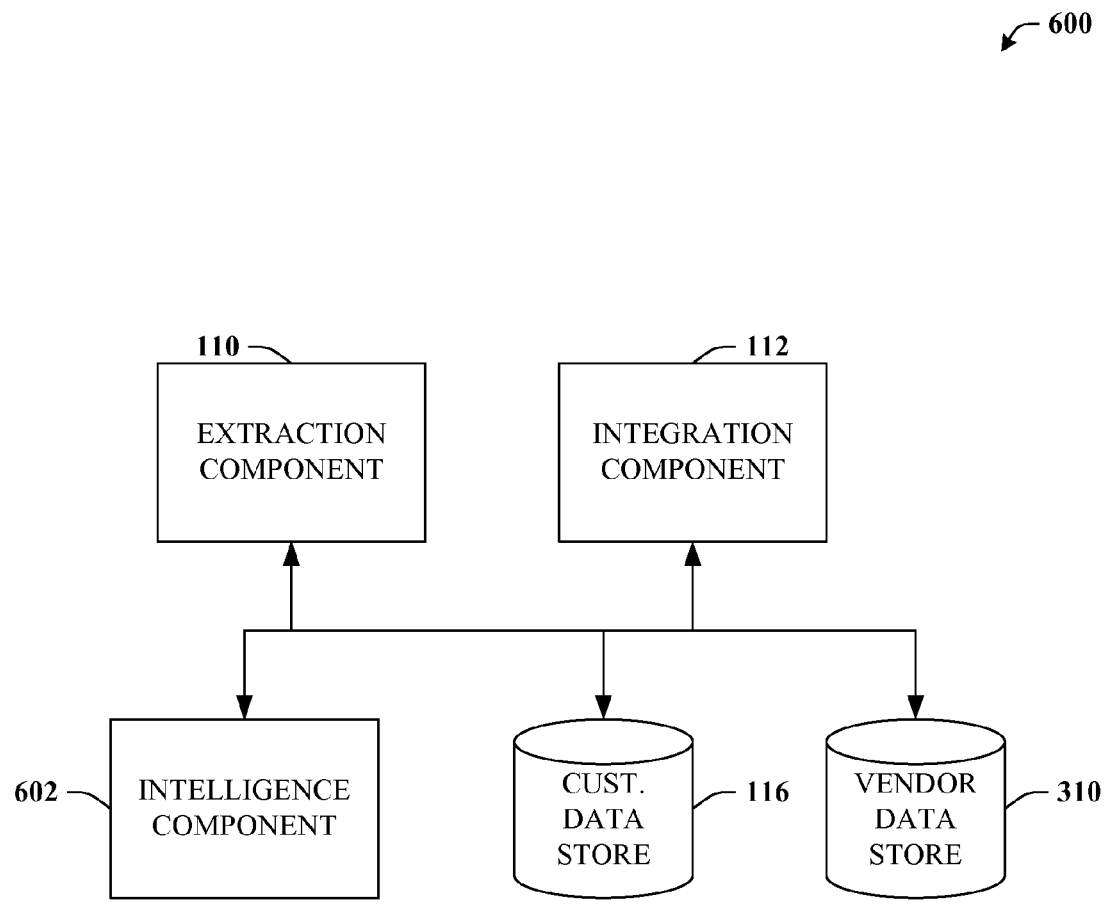
FIG. 6 depicts a block diagram of a system that can aid with various inferences.

With reference now to FIG. 6, system 600 that can aid with various determinations or inferences is depicted. Typically, system 600 can include extraction component 110 that can, inter alia, make various inferences or intelligent determinations. For example, extraction component 110 can intelligently translate image 302 into text data 304 by employing OCR techniques as well as populating global or vendor-specific rules 306 for improving or optimizing translation. In addition, extraction component 110 can intelligently identify what information of a transaction receipt 104 or record 502 is or can be relevant, potentially based upon one or more particular applications for which verification or feedback is requested, useful, or required. System 600 can also include integration component 112 that can intelligent determine whether to transmit relevant transaction data 114 or provide signal 502 as well as when or how to update data store 116 or profile 118.

In addition, system 600 can also include intelligence component 602 that can provide for or aid in various inferences or determinations. It is to be appreciated that intelligence component 602 can be operatively coupled to all or some of the aforementioned components. Additionally or alternatively, all or portions of intelligence component 602 can be included in one or more of the components 110, 112. Moreover, intelligence component 602 will typically have access to all or portions of data sets described herein or otherwise suitable to the claimed subject matter, such as data store 116 as well as potentially portions of vendor data store 310, and can furthermore utilize previously intelligently determined or inferred data.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
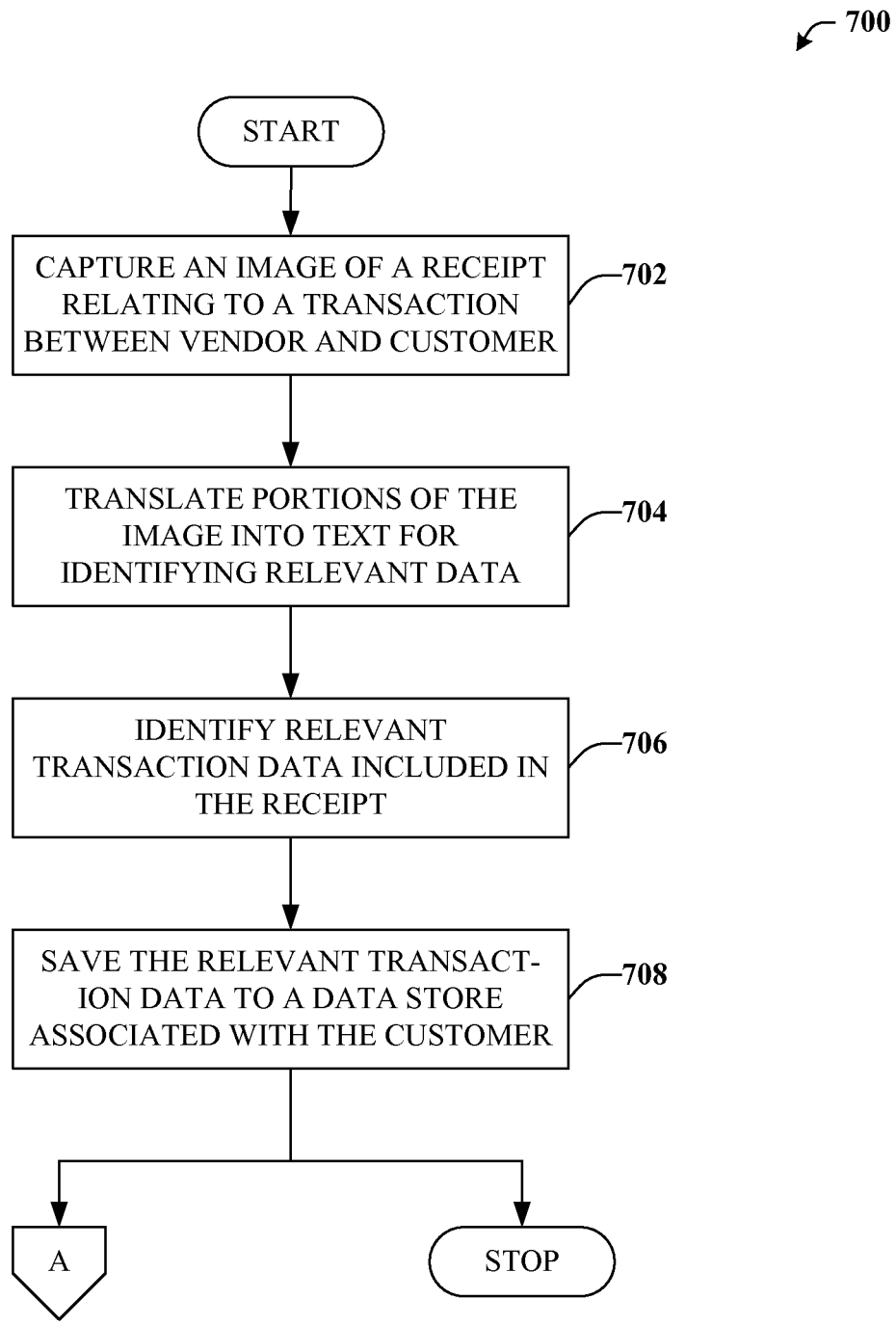
FIG. 7 is an exemplary flow chart of procedures that define a method for facilitating verification or feedback by examining consumer transactions described in a receipt.
Figure 8:
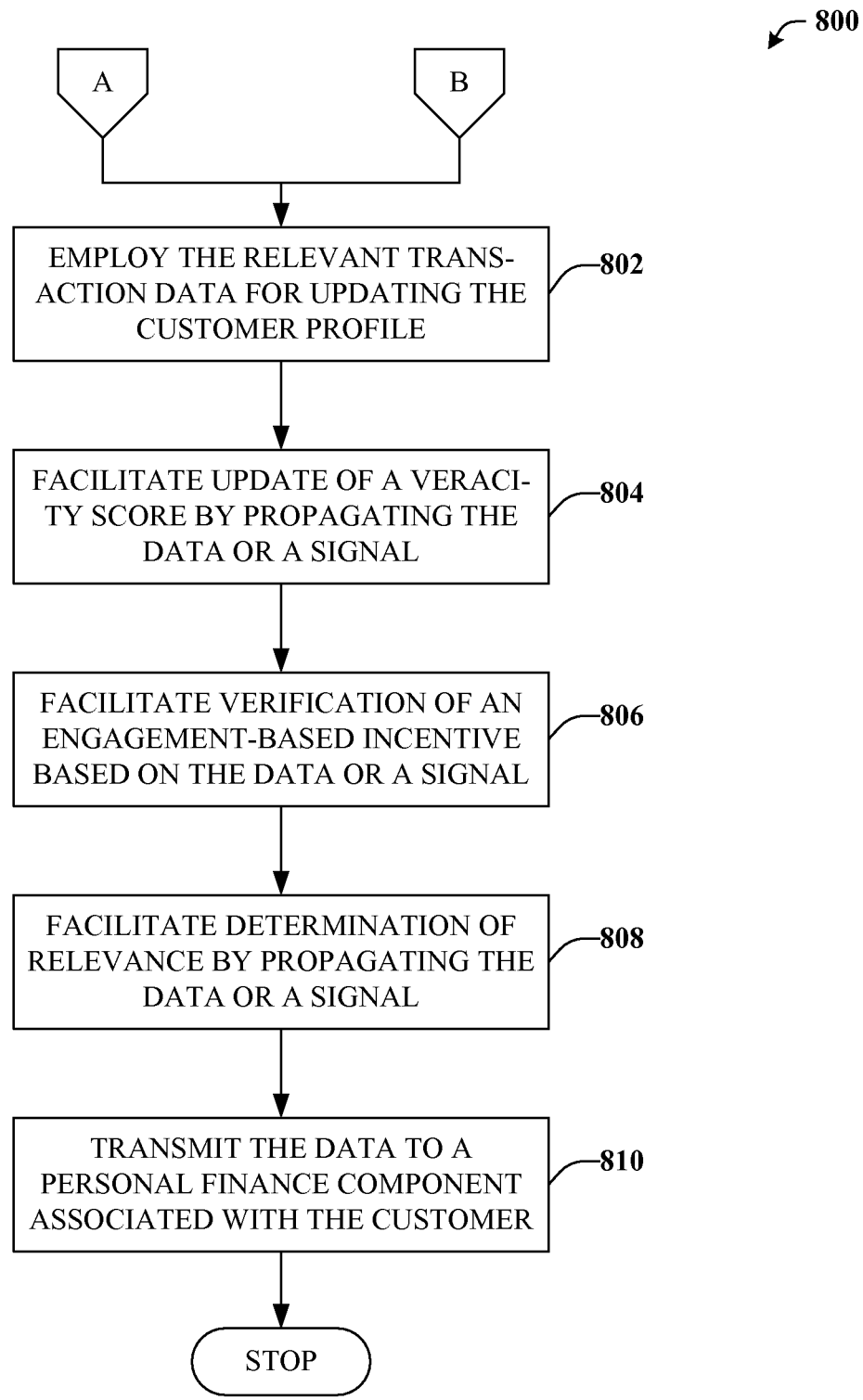
FIG. 8 illustrates an exemplary flow chart of procedures that define a method for providing verification or feedback in connection with the transaction.
Figure 9:
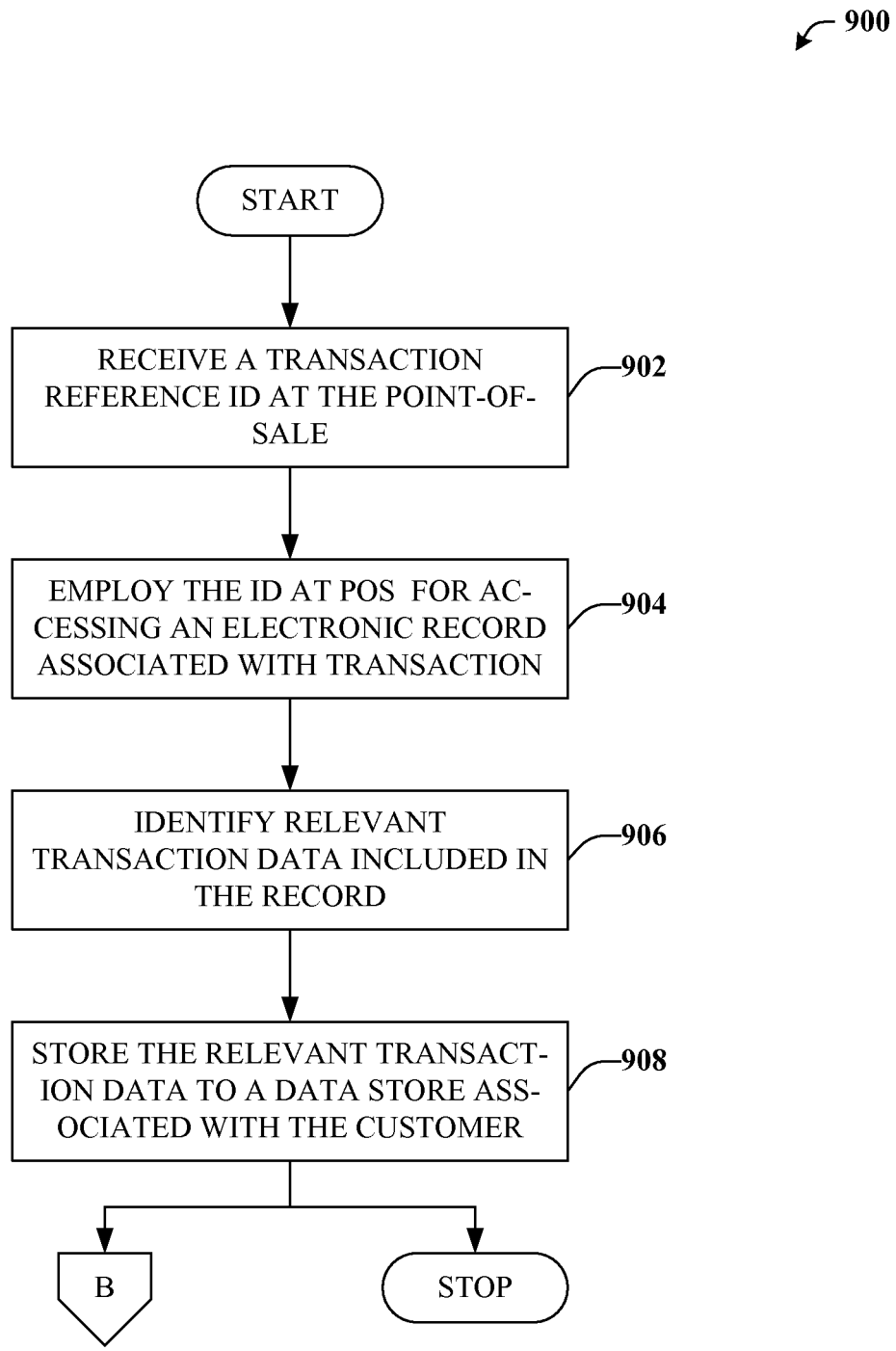
FIG. 9 depicts an exemplary flow chart of procedures defining a method for facilitating mobile verification or feedback by examining consumer transactions described in an electronic record.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary method 700 for facilitating verification or feedback by examining consumer transactions described in a receipt is illustrated. Generally, at reference numeral 702, an image of a receipt relating to a transaction between a vendor and a customer can be captured. The receipt can be a paper receipt printed by the vendor at the conclusion of or as a result of the transaction and the image can be a digital image captured, by an optical device such as a digital camera or a portion of a device that includes imaging capabilities.

At reference numeral 704, relevant transaction data included in the receipt can be identified and at reference numeral 706, all or portions of the image can be translated into text-based, machine-editable data in order to identify relevant data. In accordance therewith, certain OCR techniques can be employed to translate the image and relevant transaction data can be identified based upon the context or type of data, the location of the data in the receipt, the size, symbol or font, and so forth. Examples of relevant transaction data with respect to the transaction can include vendor information, a date of the transaction, a time of the transaction, a customer rewards identification, a descriptor for one or more purchased items, a sale price for one or more purchased items, a discount price associated with one or more purchased items, a Universal Product Code (UPC) for one or more of purchased items, a savings code for one or more purchased items, or a transaction reference ID.

At reference numeral 708, the relevant transaction data identified at acts 704, 706 can be saved to a customer data store, wherein the customer data store can include a profile associated with the customer. It should be appreciated that the data store can be included in a mobile device or another device owned or maintained by the customer and can, in addition, be accessible to at least one disparate component that can benefit from verification or feedback related to transactions between the customer and the vendor, which is further described in connection with FIG. 8.

Turning now to FIG. 8, exemplary method 800 for providing verification or feedback in connection with the transaction is depicted. In accordance with an aspect, at reference number 802, relevant transaction data can be employed for updating the profile associated with the customer. Hence, verification or feedback can be provided to the profile and/or to components that can access the profile. Accordingly, the verification or feedback can enrich or enable features associated with disparate components. For example, at reference numeral 804 update of a veracity score included in the profile can be facilitated by propagating at least one of the relevant transaction data or a signal indicating the profile has been updated with the relevant transaction data.

In another aspect, at reference numeral 806, verification that an engagement-based incentive associated with the profile has been satisfied can be facilitated. For instance, relevant transaction data pertaining to the satisfaction of the engagement-based incentive can be propagated, as can a signal indicated that the profile has been appropriately updated for such.

At reference numeral 808, determination of a relevance of an advertisement can be facilitated based upon a transaction history included in the profile by propagating at least one of the relevant transaction data or a signal indicating the profile (e.g., a transaction history portion) has been updated. At reference numeral 810, the relevant transaction data (or a signal relating thereto) can be transmitted to a personal finance component associated with the customer. It should be appreciated and understood that one or more acts included in method 800 can be employed in connection with either or both of methods 700 and 900 or FIGS. 7 and 9, respectively.

With reference now to FIG. 9, method 900 for facilitating mobile verification or feedback by examining consumer transactions described in an electronic record is illustrated. In general, at reference numeral 902, a transaction reference ID that relates to a transaction between a vendor and a customer can be received. The transaction reference ID can be received at the POS by way of a mobile device, and can further be received by way of wireless transmission originating with the vendor, or can be read from a receipt and input to, e.g., the mobile device, either automatically or manually by the customer.

At reference numeral 904, the transaction reference ID can be employed at the POS for accessing an electronic record associated with the transaction. The electronic record can potentially include all or portions of the transaction data described herein, such as that typically found in a transaction receipt. Appreciably, the electronic record will typically be included in a data store maintained by the vendor and information included in the electronic record or accessible portions of the data record can be limited only to data associated with the transactions with a particular customer.

At reference numeral 906, relevant transaction data included in the record can be identified. As with some acts detailed supra, examples of relevant transaction data with respect to the transaction can include vendor information, a date of the transaction, a time of the transaction, a customer rewards identification, a descriptor for one or more purchased items, a sale price for one or more purchased items, a discount price associated with one or more purchased items, a Universal Product Code (UPC) for one or more of purchased items, a savings code for one or more purchased items, or a transaction reference ID. At reference numeral 908, the relevant transaction data identified at act 906 can be saved to a customer data store, wherein the customer data store can include a profile associated with the customer.

Figure 10:
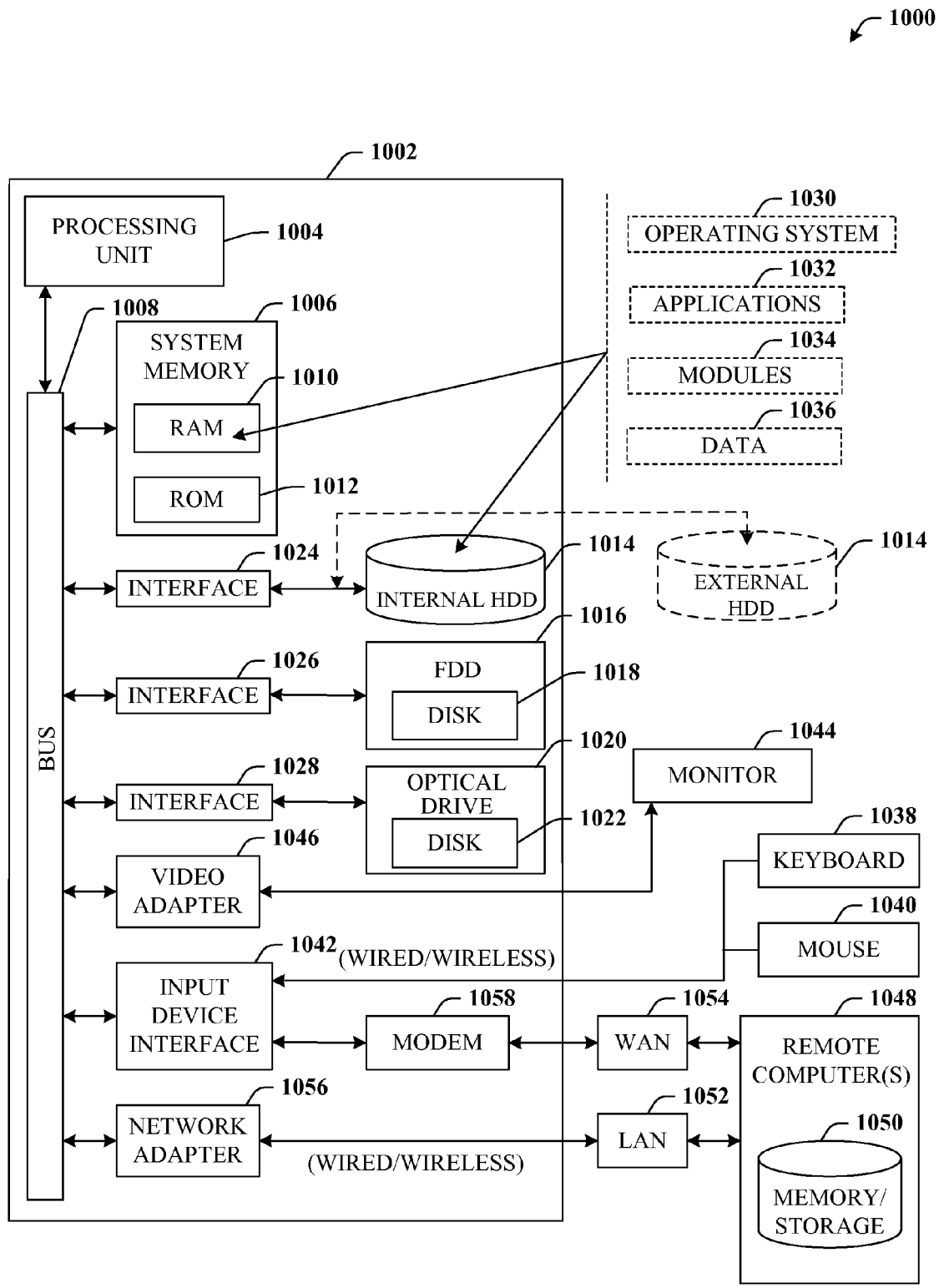
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
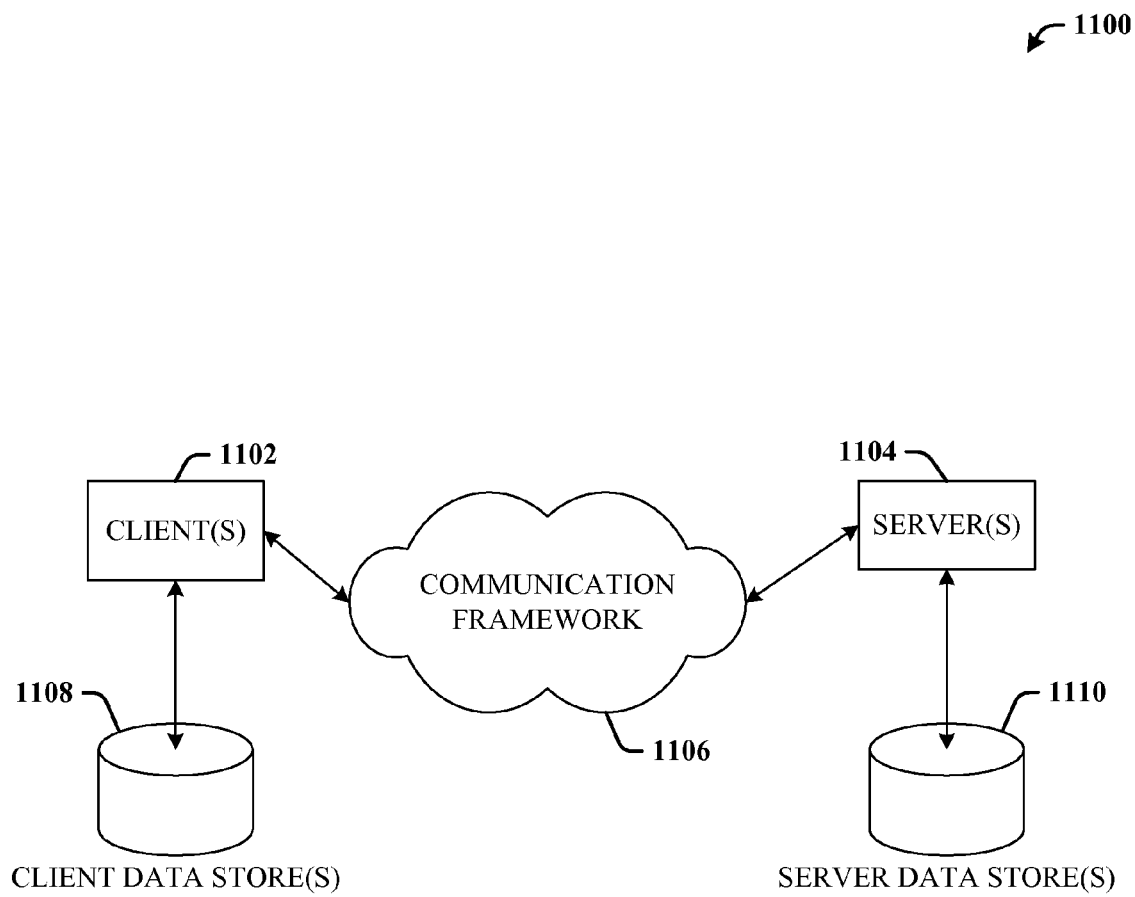
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system having an optical device that tracks consumer transactions in order to facilitate verification or feedback, the system comprising:
   an optical device that reads a receipt that relates to a transaction between a vendor and a customer, the receipt comprising a set of transaction-related data;
   an extraction component that identifies and extracts relevant transaction data from the set of transaction-related data, relevant transaction data comprising data useable by one or more applications residing on one or more components, the identification of relevant transaction data dependent upon an identity of the one or more applications; and
   a data store that stores the relevant transaction data and customer profile information, wherein the relevant transaction data and the customer profile information are accessible and useable by the one or more applications residing on the one or more components.

2. The system of claim 1, wherein the receipt is a paper receipt printed by the vendor or an electronic receipt or record transmitted by the vendor at a point-of-sale (POS).

3. The system of claim 1, wherein the optical device includes a camera that creates a digital image of the receipt.

4. The system of claim 1, wherein the extraction component translates a digital image of the receipt into text-based machine-editable data in order to identify the relevant transaction data.

5. The system of claim 1, wherein the extraction component utilizes optical character recognition to translate the receipt.

6. The system of claim 1, wherein the system further comprises an integration component that utilizes the relevant transaction data to update the customer profile information.

7. The system of claim 6, wherein the integration component transmits the relevant transaction data to one of the one or more components that updates a veracity score included in the profile, and further wherein the veracity score reflects a tendency of the customer to fulfill published shopping objectives.

8. The system of claim 6, wherein the integration component transmits the relevant transaction data to one of the one or more components that verifies that an engagement-based incentive associated with the profile has been satisfied.

9. The system of claim 6, wherein the integration component transmits the relevant transaction data to one of the one or more components that determines a relevance of an advertisement based upon a transaction history included in the profile.

10. The system of claim 6, wherein the integration component transmits the relevant transaction data to a personal finance component associated with the customer.

11. The system of claim 1, wherein the extraction component retrieves a translation legend for the receipt from a vendor data store maintained by the vendor.

12. The system of claim 1, wherein the relevant transaction data is a transaction reference ID and the extraction component employs the transaction reference ID to access a vendor data store maintained by the vendor.

13. The system of claim 11, wherein the extraction component retrieves other relevant transaction data from a record associated with the transaction reference ID included in the vendor data store.

14. Computer-readable hardware devices having embodied thereon computer-useable instructions that, when executed by a computing device, the computing device having a processor and a data store, implement a method for facilitating verification or feedback by examining consumer transactions described in a receipt, the method comprising:
   a. capturing an image of a receipt relating to a transaction between a vendor and a customer, the receipt comprising a set of transaction-related data, wherein the set of transaction-related data comprises one or more of vendor information, a date of the transaction, a time of the transaction, a customer rewards identification, a descriptor for one or more purchased items, a sale price for one or more purchased items, a discount price associated with one or more purchased items, a Universal Product Code (UPC) for one or more of purchased items, a savings code for one or more purchased items, or a transaction reference ID;
   b. translating portions of the image into text-based machine-editable data;
   c. determining utilizing the processor of the computing device relevant transaction data from the text-based machine-editable data, the relevant transaction data comprising data useable by one or more applications, the determination of relevant transaction data dependent upon an identity of the one or more applications
   d. storing the relevant transaction data to the data store, the data store storing the relevant transaction data and customer profile information, the customer profile information including at least demographic data, shopping preferences, and one or more transaction histories; and
   e. communicating the relevant transaction data and the customer profile information to the one or more applications.

15. The computer-readable hardware devices of claim 14, wherein the method further comprises utilizing a mobile device for the act of imaging, and wherein the data store resides on the mobile device.

16. The computer-readable hardware devices of claim 14, wherein the method further comprises at least one of the following acts:
   f. employing the relevant transaction data for updating the customer profile information;
   g. facilitating update of a veracity score included in the profile by propagating at least one of the relevant transaction data or a signal indicating the profile has been updated;
   h. facilitating verification that an engagement-based incentive associated with the profile has been satisfied by propagating at least one of the relevant transaction data or a signal indicating the profile has been updated;
   i. facilitating determination of a relevance of an advertisement based upon a transaction history included in the profile by propagating at least one of the relevant transaction data or a signal indicating the profile has been updated; or
   j. transmitting the relevant transaction data to a personal finance component associated with the customer.

17. Computer-readable hardware devices having embodied thereon computer-useable instructions that, when executed by a computing device having a processor and a data store, implement a method for facilitating mobile verification or feedback by examining consumer transactions described in an electronic record, the method comprising:

k. receiving at a point-of-sale a transaction reference ID that relates to a transaction between a vendor and a customer;

l. employing at the point-of-sale the transaction reference ID for accessing an electronic record associated with the transaction, wherein the electronic record is included in a vendor data store maintained by the vendor, and wherein the electronic record comprises a set of transaction-related data;

m. identifying utilizing the processor of the computing device relevant transaction data from the set of transaction-related data, the relevant transaction data comprising data useable by one or more applications residing on one or more components, the identification of the relevant transaction data dependent upon an identity of the one or more applications;

n. storing the relevant transaction data to the data store, the data store comprising the relevant transaction data and customer profile information; and o. transmitting the relevant transaction data and the customer profile information to at least one of the one or more components, the one or more components including:

i. a ranking component that updates a veracity score associated with the customer, the veracity score indicating a tendency of the customer to fulfill shopping objectives as evidenced by the relevant transaction data, ii. a promotion component that verifies, using the relevant transaction data, that an engagement-based incentive associated with the customer profile information has been satisfied, iii. a classification component that determines a relevance of an advertisement based upon a transaction history of the customer and the relevant transaction data, iv. a selection component that selects an advertisement based upon an attribute associated with the customer profile information and the relevant transaction data, or v. a personal finance component that utilizes relevant transaction data to track personal finances of the customer.

18. The computer-readable hardware devices of claim 17, wherein a determination to transmit at least one of the relevant transaction data is based at least in part upon an inference drawn from the set of observations as captured by the events or data.

* * * * *